UNITED STATES PATENT OFFICE.

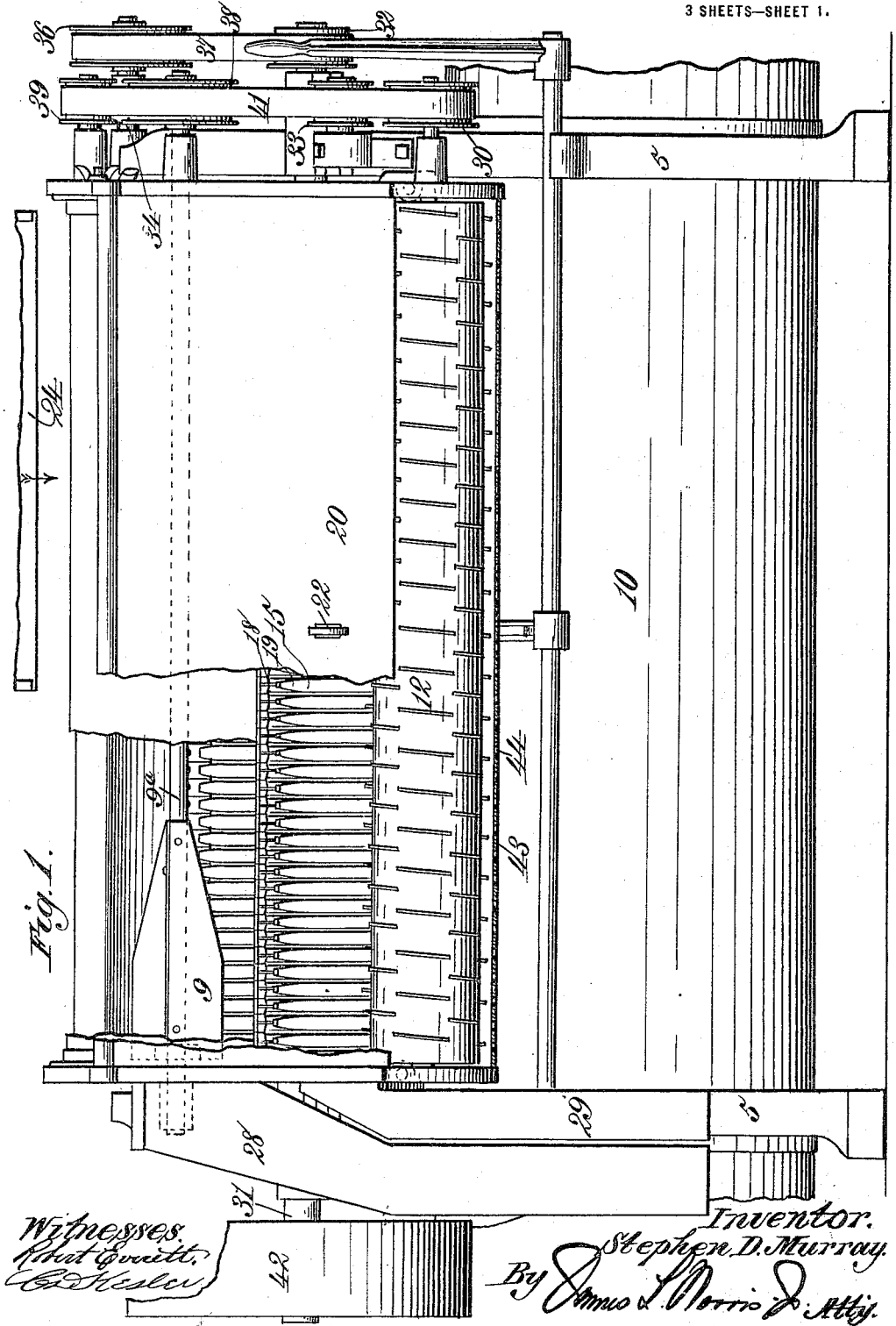

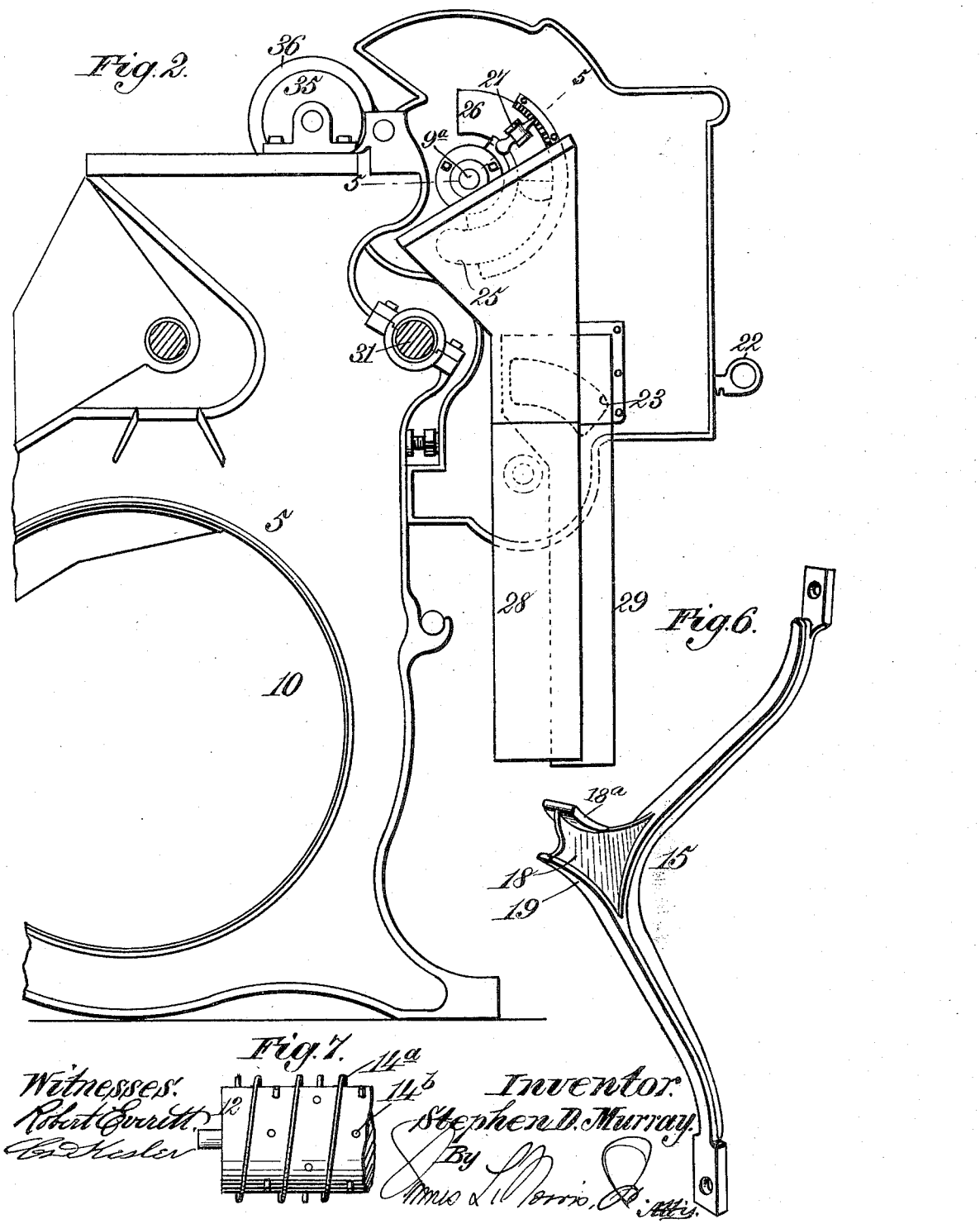

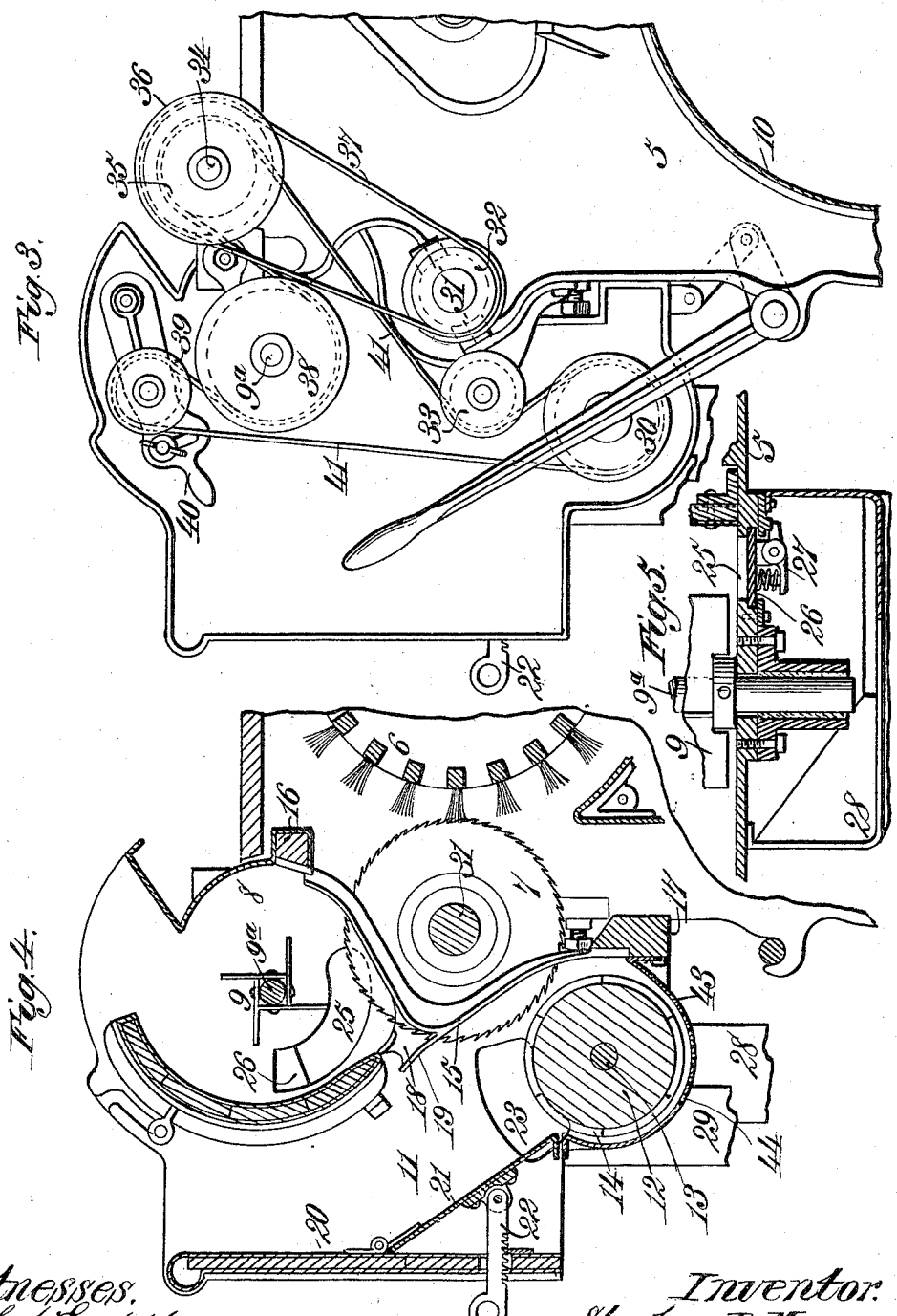

STEPHEN D. MURRAY, OF DALLAS, TEXAS.

HULLER-GIN.

1,193,409. Specification of Letters Patent. Patented Aug. 1, 1916.

Application filed January 7, 1911. Serial No. 601,317.

*To all whom it may concern:*

Be it known that I, STEPHEN D. MURRAY, a citizen of the United States, residing at Dallas, in the county of Dallas and State of Texas, have invented new and useful Improvements in Huller-Gins, of which the following is a specification.

This invention relates to huller gins, and the purpose of the same is to provide a machine of this class having a continuous and effective operation with less waste of cotton from the hulling chamber or box, and wherein accumulation of hulls and clogging of the hulling chamber is avoided and also wherein foreign matter is prevented from lodging in and fouling the ginning roll box.

One of the most essential features of the improved gin is the simultaneous rotation and longitudinal movement of the material to be ginned in the hulling chamber from a point of feed toward an enlarged outlet or discharge in addition to the ordinary means of outlet in gins of this type.

A further essential feature of the improved gin is the use of a roll box for ginning seed cotton wherein the cotton is simultaneously rotated and longitudinally shifted or moved from a point of feed toward a seed outlet in conjunction with a hulling chamber which may be utilized in supplying the roll box with the seed cotton.

A further essential feature is the provision in a huller gin of a hulling chamber and a ginning roll box wherein the material to be ginned is simultaneously rotated and longitudinally moved from a point of feed toward an enlarged discharge opening or outlet to clear the hulling chamber of residuum, such as hulls and foreign matter, and the ginning roll box of foreign matter and seed.

A further essential feature of the invention consists in the operative conjunction of a hulling chamber and a ginning roll box wherein the material to be ginned is simultaneously rotated and longitudinally moved from a point of feed to a point of discharge, and wherein the hulling chamber is provided with additional means for adapting it to handle without waste the cleaner picked grades of seed cotton and eliminating therefrom trash or other foreign bodies contained therein before the seed cotton enters the ginning roll box, and for catching the seed cotton that may pass through the ordinary outlets of said chamber and causing the seed cotton to be returned to the chamber.

The invention still further contemplates the construction, arrangement and combination of coördinate elements and mechanical devices which will be more fully hereinafter described in preferred form.

In the drawings one practical embodiment of the improved huller gin is shown, but it will be understood that the invention is not in the least limited by the structures as illustrated in the drawings and all changes will be adopted within the purview of the claims.

In the drawings: Figure 1 is a front elevation, partially broken away, of a huller gin embodying the features of the invention. Fig. 2 is an end elevation of the same, also partially broken away. Fig. 3 is an elevation looking toward the end opposite that illustrated by Fig. 2 and particularly showing the operating means for a portion of the ginning devices. Fig. 4 is a transverse vertical section through the gin, also partially broken away. Fig. 5 is a detail section taken in the plane of the line 5—5, Fig. 2. Fig. 6 is a detail perspective view of one of the ribs. Fig. 7 is a detail view of a portion of the huller roller showing a modification of the peripheral feed means thereof.

The numeral 5 designates the end legs of the frame structure of the gin of such contour as to adapt them to receive the working parts of ginning devices as well as the hulling chamber and roll box and connected by any suitable means to render the gin organization as an entirety stable as well as strong and durable. The improved gin also includes a brush cylinder 6, a saw cylinder 7, and a ginning roll box 8 having a roll impeller 9 therein on a suitable shaft $9^a$ having bearing in the heads or end walls of the roll box. The brush cylinder coöperates with the saw cylinder in the usual manner and directs the lint cotton into a tube or flue 10. In front or advance of the saw cylinder 7 and roll box 8 is a hulling chamber 11 provided with a huller roller 12 having a shaft 13 bearing at opposite extremities in the heads or end walls of said chamber and provided with peripheral means such as a flight 14 that may be broken, as shown by Figs. 1 and 4, or continuous as at $14^a$ and coöperating with outwardly projecting spikes $14^b$, see Fig. 7, for the purpose of imparting a longitudinal feed or movement of the material to be ginned in the hulling chamber and also a simultaneous rotary movement of said material to throw the latter upwardly to the saws of the saw cylinder 7 so as to effectively remove the cotton from the hulls. It should be understood that when the spiral flight or flange 14 of the huller roller is arranged in a continuous unbroken spiral, it will not be thoroughly effective as a means for causing a rotary movement of the material. So arranged, the spiral would be somewhat disposed to cut through the material and while being thoroughly effective in moving the material lengthwise along the hulling chamber it would lack thoroughness and effectiveness in moving the material toward the saws and imparting thereto a rotary movement under maximum feed conditions, and therefore, when the spiral device 14ª is fixed to the huller roller in a continuous unbroken form, as shown by Fig. 7, the spikes or pins 14ᵇ are necessary to secure effective rotary movement of the material for moving it against the saw teeth. If the spiral flights or flanges 14 are fixed to the huller roller in separated sections, as shown by Figs. 1 and 4, then the spikes or pins will not be necessary as the cut, broken or separated spiral sections will be thoroughly efficient in imparting a rotary as well as a longitudinal movement to the material in the hulling chamber. Between the roll box 8 and the rear lower portion of the hulling chamber 11 is a plurality of ribs 15 uniformly extending throughout the length of the gin or from one extremity of the hulling chamber to the opposite extremity of said chamber, the saws of the saw cylinder 7 projecting forwardly between the ribs over the roller 12 and also upwardly into the lower portion of the roll box 8. The ribs 15 are secured at their upper and lower extremities to rails 16 and 17 and have intermediate hulling extensions 18 with lower hull deflecting edges 19 standing above and well over the roller 12 so that such hulls as are picked up by the saws with the cotton will be thrown upwardly and strike the edges 19 and by the latter deflected forwardly into the hulling chamber for repeated movement by the huller roller back again to the saws to insure an efficient removal of the cotton from the hulls. The ribs 15 irrespective of the location and function of the hulling extensions 18 are provided with intermediate means, or means located between the attached terminals thereof for maintaining the ribs in fixed relative position to resist lateral movement without resorting to fastening devices or the use of an extra rail, or the connection thereof to the lower part of the breast as usually pursued, and said means consists of a table or plate 18ª laterally projecting at opposite sides from the intermediate portion of each rib to engage similar projecting sides of contiguous ribs, and when all of the intermediate means of the ribs are thus associated and the similar means of the end ribs engage portions of the inner sides of the end walls or heads of the roll box, the whole series of ribs at their intermediate portions are held in a stable position and maintained in accurate relation to each other. The front wall 20 is pivotally supported so that it may be readily thrown up and detached in the ordinary way, and the ends of the hulling chamber and of the ginning roll box together with the breast may also be detached or moved upwardly, as will be readily understood. To the inner lower portion of the wall 20 a lambrequin 21 is adjustably attached and operative in the usual manner through the said wall, as for instance by a latch 22.

It will be understood that the ordinary outlets between the saws of the saw cylinder 7 and the roller 12, and between the latter and the adjacent edge of the lambrequin 21 are present in this improved gin, and in addition to these ordinary outlets an enlarged outlet or discharge opening 23 is provided which in the present instance is shown as being located at one end of the hulling chamber or at a point distant from the extremity of the said chamber to which the material to be ginned is fed, as for instance by a suitable chute or tube or any other analogous device 24 disposed above and extending partially over the hulling chamber in a longitudinal direction, as shown by Fig. 1. The ginning roll box 8 is also provided with an enlarged seed discharge or outlet having a regulating valve or gate, the said seed outlet being in the present instance provided at one end of the said roll box as at 25 and having a sliding valve 26 to control the size of the opening or outlet, the said valve being held in adjusted position by a suitable securing means 27, as shown by Fig. 2. The outlets for the seed as provided in ordinary gin structures are constricted in the roll box 8 to prevent escape of seed therethrough and all of the seed as well as any foreign matter that may find its way into said box is caused to be discharged through the enlarged opening 25. The opening 25 communicates with the upper extremity of an outlet tube or chute 28, and the enlarged opening 23 of the hulling chamber establishes communication between the chamber at one end and the upper extremity of an outlet tube or chute 29, the latter being structurally independent of the tube or chute 28 so that the seed and any foreign matter that may pass out of the roll box 8 and the hulls discharged from the chamber 11 are delivered from the gin separately.

The shaft 13 of the huller roller 12 has a band wheel or pulley 30 fixed on one end thereof and on one end of the shaft 31 of the saw cylinder 7 is a band wheel or pulley 32 with an idler or direction pulley 33 mounted adjacent thereto. On the upper portion of the gin a direction shaft 34 is mounted in suitable bearings and has two pulleys 35 and 36 keyed thereon, and trained over the pulley 36 and saw shaft pulley 32 is a belt 37 by which motion is imparted to the shaft 34 and the pulley 35. On the one end of the impeller shaft 9$^a$ is a band wheel or pulley 38, and above the latter is an idler or direction pulley 39 carried by movable means 40 to serve as a belt tightener. Motion is transmitted from the pulley 35 by a belt 41 surrounding the same and engaging the band wheel or pulley 38, the direction pulley 39, the band wheel 30 of the roller 12, the direction pulley 33, and thence back to the transmitting pulley 35. By this means it will be seen that all of the operative mechanism except the brush cylinder are driven primarily from the saw cylinder shaft, and the latter is supplied at the end opposite that carrying the band wheel or pulley 32 with a driving pulley 42, as shown by Fig. 1, and to which power may be applied from a suitable source. The brush cylinder 6 will also be driven by means of suitable belts and pulleys operated from a power source or line shaft in the ordinary manner.

To adapt the improved gin for handling and ginning the cleaner picked grades of seed cotton without waste, a concave shield or cover 43 is applied over the lower portion of the huller roller 12 and removably attached at its opposite edges by any suitable means to contiguous parts of the gin. This shield or cover guards all of the ordinary outlet openings along the roller 12 to prevent loss of cotton through said openings, and the small portions of cotton that pass down below the roller are caught by the shield or cover and returned to the chamber 11 and mingle with the mass of cotton in the chamber as heretofore specified. To permit the finer particles of dirt that may settle on the shield or cover to escape, the said shield or cover is preferably perforated, as at 44. This shield or cover will not remain attached to the gin at all times, because when the chamber 11 is used as a hulling chamber for the coarser grades or hully cotton it is necessary to have the ordinary outlet openings clear in order to do the best work. Huller gins as ordinarily constructed with the usual outlets along the huller roller for escape of portions of the hulls have been found defective for use in preliminarily treating grades of cotton which are cleaner than hully cotton, because small particles of the cotton would pass through the said usual outlets with material loss or waste, and thus in a measure offset advantages the huller gins might otherwise possess. The attachment, consisting of the shield or cover 43, is, consequently, an important feature in that by addition of a simple device to the hulling chamber, any cotton that escapes through the usual outlets and passes down below the huller roller is caught by the shield and held in the plane of action of and returned by the roller to the hulling chamber and mingled with the mass of cotton in the latter chamber. Moreover, by removing the shield or cover 43 the improved gin can be easily and expeditiously restored to a condition to adapt it for effectively treating hully cotton. It will be understood that the shield or cover 43 constitutes simply an attachment for the main gin, said shield or cover being used only at such times as the condition of the cotton may require, as above noted.

In the operation of the gin as a huller, the hulls mixed with the cotton are fed into one extremity of the chamber 11 through the chute or feeding means 24 and fall or gravitate upon the huller roller 12 by which they are thrown up against the saws of the cylinder 7, the said saws picking up the cotton as it is thrown thereagainst and pulling the same together with the seed through the ribs into the ginning roll box 8, the hulls when thrown up being intercepted by the adjacent edges of the ribs and deflected or thrown over by the upper edge portions 19 and then again brought back or thrown up in contact with the saws, and at the same time moved longitudinally through the hulling chamber toward the outlet or discharge 23 at one end of the chamber. The mass of hully cotton or of the shells entering and remaining in the hulling chamber until discharged by means just explained is not only fed lengthwise through the said chamber toward the discharge opening 23, but at the same time is given a rotary movement, thereby permitting the saws to effectively remove or separate the cotton from the hulls during the transit or movement of the latter toward the said outlet or discharge opening. The rotary movement is given to the material within the hulling chamber by the coöperative action of the huller roller 12 and the saws of the saw cylinder, and the longitudinal movement is imparted to said material by the feeding device or devices on the huller roller. The feeding device or devices on the huller roller, as at 14, are preferably set spirally so as to operate on the material after the manner of a feeding screw, and by this means regularly push or convey the material throughout the length of the hulling chamber. During this operation the smaller portions of hulls will escape from the hulling chamber in the usual manner or through the ordinary openings, whereas the hulls and foreign bodies too large to escape by the ordinary openings are moved toward and liberated through the enlarged outlet or opening 23, the saws effectively picking up all of the cotton before it reaches the said outlet. The cotton carried into the ginning roll box 8 by the saws is subjected to the usual ginning operation to separate the seed and thoroughly clean the latter or free them of lint and the seed are moved longitudinally toward the outlet or discharge opening 25 at one end of the roll box as there are no other means of escape along the roll box for the seed. The movement of the seed longitudinally through the roll box is caused by the rotation of the cotton in the box and the crowding of the rotating seed by the cotton toward the discharge or outlet opening of the said box due to the feed of the cotton in excess or almost wholly at one extremity of the roll box as compared to a minimized or practically little or no feed at the opposite extremity adjacent to the discharge or outlet opening for the feed. Inasmuch as the effectiveness of the gin saws for rotating the cotton in the roll box depends upon the concatenation of the cotton fibers and the grip of the saw teeth therein, it follows that at the portion of the roll box adjacent to the seed outlet other means than the gin saws must be provided for maintaining the rotary movement of the material of the roll at that point because at said point the material of the roll is practically all clean seed or seed that has been freed from lint and not rotatable by the gin saws; consequently to maintain the rotary movement of this portion of the roll adjacent to the outlet the roll impeller 9 is fixed on the extremity of the shaft 9ᵃ.

What is claimed as new is:

1. In a huller gin, a hulling chamber provided with a main end discharge opening, a feeding means extending over a portion of the chamber at a point distant from said discharge opening, means for throwing material therein upwardly and also moving it longitudinally of the chamber toward said main discharge opening and causing the hully material to be fed through said end opening, a ginning roll box also having an end discharge outlet toward which seed is constantly crowded longitudinally in the box, and ginning devices coöperating both with the chamber and box, seed cotton being delivered into the roll box in greatest quantity adjacent the point of feed of the chamber.

2. In a huller gin, a hulling chamber provided with an enlarged end discharge outlet and with means for moving material therein longitudinally thereof toward said enlarged outlet, feeding means disposed along a portion of said chamber at a point distant from the enlarged outlet, a ginning roll box having an enlarged end discharge outlet toward which material therein is moved in a longitudinal direction, the ginning roll box being supplied with a greater quantity of seed cotton adjacent to the feeding means for the chamber than at the remaining portion thereof, all of the material being moved longitudinally of the hulling chamber and the cotton picked up from the hulling chamber and taken into the roll box, and ginning devices coöperating with the chamber and roll box.

3. In a huller gin, a hulling chamber having an outlet at one extremity, a huller roller in the chamber having means for rotating and longitudinally moving the material in the chamber in one direction only, a ginning roll box, ribs interposed between the chamber and roll box and having deflecting portions above the roller and also having the spaces between them decreasing in width above the deflecting portions and below the latter, and ginning saws coöperating with the chamber and roll box and projecting into both of the latter, the hull deflecting portions of the ribs being over the portions of the saws projecting into the chamber.

4. In a huller gin, a hulling chamber having a huller roller mounted therein and provided with an enlarged outlet, the roller having means for rotating and longitudinally moving the material in the chamber, the ordinary outlet being provided along the front and rear of the roller, a ginning roll box, ginning devices interposed between the roll box and chamber, and means for temporarily closing the lower portions of the chamber and the ordinary outlets and causing residuum from the seed cotton to be discharged solely through the enlarged outlet and the small particles of cotton that may pass down under the roller to be returned to the chamber.

5. In a huller gin, a hulling chamber provided with an enlarged outlet and also having a roller therein having the usual outlets along the front and rear portions thereof normally open and having means for moving the material longitudinally of the chamber, a ginning roll box, ginning devices interposed between and coöperating with the chamber and roll box, and removable means applied under the roller for closing the said usual outlets along the front and rear portions of the roller.

6. In a huller gin, a hulling chamber provided with an enlarged end outlet and the usual bottom outlets and also having means therein for rotating and simultaneously longitudinally moving material therein toward the said outlet, a ginning roll box, ginning devices interposed between the chamber and roll box and coöperating with both of the latter, and removable means for closing the 7. In a huller gin, a hulling chamber provided with an enlarged end outlet in addition to the ordinary outlets, means in the chamber for simultaneously rotating and moving material therein longitudinally through the chamber toward said enlarged outlet, ginning devices coöperating with the chamber, and means for closing the ordinary outlets and causing a discharge of the hulls and trash through the said end outlet.

8. In a huller gin, a hulling chamber provided with an enlarged outlet and having the ordinary outlets, a huller roller mounted in the chamber, ginning saws coöperating with the chamber, the roller performing its ordinary function of casting the material upon the saw teeth and also moving the material longitudinally in the chamber, and means for closing the lower portion, including the ordinary outlets, of said chamber.

9. In a gin, means for containing seed cotton for ginning purposes having a plurality of ribs, the said ribs provided with intermediate extensions carrying laterally projected portions at the terminals having edge contact with each other to resist displacement of the ribs longitudinally of the means for containing seed cotton, and rotary ginning devices individually movable between the ribs below the said intermediate extensions and laterally projected contacting portions of the ribs, the intermediate extensions of the ribs preventing shells and trash being taken up and drawn through between the ribs by the ginning devices.

10. In a gin, a roll box having a plurality of ribs and a breast, the ribs being secured at their upper and lower extremities and provided with intermediate laterally extending portions having edge engagement with relation to each other and located solely within the bottom of the roll box to sustain the ribs in operative relation and prevent movement thereof longitudinally of the roll box independently of fastening means therefor, a hulling chamber adjacent to the roll box, and rotary ginning devices individually movable between the ribs below the extensions and laterally projected portions of said ribs and operative both in the roll box of the gin and in the hulling chamber.

11. A cotton gin having a roll box and hulling chamber each provided with an end outlet, ginning devices coöperating with the box and chamber, and a feeding device arranged to feed seed cotton to the roll box by coöperation of the ginning devices along a portion of the length of the ginning devices, the progressive course of the matter separated from the fiber being longitudinally along the ginning devices in the box and chamber toward the said end outlets.

12. In a huller gin, the combination of a huller chamber having an enlarged opening at one end, and a roller mounted in the said chamber and having means for performing its ordinary function and other means for performing the additional function of moving material longitudinally along the chamber to the said enlarged opening.

13. In a huller gin, the combination of a huller chamber having an enlarged main discharge opening at one end for hulls and foreign matter, and means in the huller chamber for moving material laterally and also longitudinally therein toward the said enlarged opening.

In testimony whereof I have hereunto set my hand in presence of two subscribing witnesses.

STEPHEN D. MURRAY.

Witnesses:
JOHN L. FLETCHER,
M. R. MULLEN.

Copies of this patent may be obtained for five cents each, by addressing the "Commissioner of Patents, Washington, D. C."